(12) United States Patent
Turk

(10) Patent No.: US 6,311,803 B1
(45) Date of Patent: Nov. 6, 2001

(54) ACOUSTICAL POSITION DETECTOR

(75) Inventor: Stefan Turk, Wuppertal (DE)

(73) Assignee: K.A. Schmersal GmbH & Co. (DE)

( * ) Notice: Subject to any disclaimer, the term of this patent is extended or adjusted under 35 U.S.C. 154(b) by 0 days.

(21) Appl. No.: 09/490,648

(22) Filed: Jan. 24, 2000

(30) Foreign Application Priority Data

Jan. 29, 1999 (DE) .............................................. 199 03 643

(51) Int. Cl.⁷ ........................................................ B66B 3/02

(52) U.S. Cl. ............................................ 187/394; 367/127

(58) Field of Search .................................... 187/391, 394, 187/291, 295; 367/121, 124, 126, 127, 129

(56) References Cited

U.S. PATENT DOCUMENTS

| 3,696,328 | 10/1972 | Schwartz . | |
|---|---|---|---|
| 4,012,588 | * 3/1977 | Davis et al. ........................... | 310/9.7 |
| 4,035,762 | 7/1977 | Chamuel . | |

(List continued on next page.)

FOREIGN PATENT DOCUMENTS

| 965203 | 6/1957 | (DE) . | |
|---|---|---|---|
| 2610127 | 9/1977 | (DE) . | |
| 3608384 | 2/1989 | (DE) . | |
| 4229079 | 3/1994 | (DE) . | |
| 0694792 | 1/1996 | (EP) . | |
| 2211046-A | * 6/1989 | (GB) .................................... | 187/394 |
| 58156872 | 9/1983 | (JP) . | |
| 60218087 | 10/1985 | (JP) . | |

OTHER PUBLICATIONS

European Search Report, Apr. 26, 2000, Application No. EP 00 10 0973.

European Search Report, Apr. 26, 2000, Application No. EP 00 10 0974.

European Search Report, Apr. 26, 2000, Application No. EP 00 10 0976.

*Apparatus for Detecting Position*, Hoepken, 09/490,647, filed Jan. 24, 2000 (10 pg).

(List continued on next page.)

Primary Examiner—Jonathan Salata
(74) Attorney, Agent, or Firm—Patterson, Thuente, Skaar & Christensen, P.A.

(57) ABSTRACT

An apparatus for detecting the position of a moveable object along a path such as a rail or a wire. The apparatus includes an acoustic signal conductor, a signal input coupler, and a signal extractor. The acoustic signal conductor extends along the travel path and has a predetermined, uniform speed at which sound is propagated. The signal input coupler is located on the moveable object to couple a clocked acoustic signal into the acoustic signal waveguide. The signal extractor is arranged at one end of the acoustic signal waveguide and is connected to an evaluation unit for determining the propagation-time of the sound signal from a position at which the sound signal is coupled to the signal extractor to accordingly generate a signal representative of the instantaneous position of the moveable object on the travel path. A sensor on the acoustic signal conductor is actuated by being passed over by the moveable object. The sensor is disposed a predetermined distance from the middle of the acoustic signal conductor and is coupled to the evaluation unit. The evaluation unit compensates errors of calibration points along the travel path by using an error polynomial with coefficients derived from errors. The errors are assigned to a specific distance on the travel path by evaluating the pulse emitted by the sensor assigned to the distance upon being passed over by the moveable object.

12 Claims, 2 Drawing Sheets

U.S. PATENT DOCUMENTS

| | | | |
|---|---|---|---|
| 4,041,495 | * | 8/1977 | Martin ................................... 340/21 |
| 4,233,588 | | 11/1980 | Satoh . |
| 4,238,844 | * | 12/1980 | Ueda et al. ......................... 367/117 |
| 4,375,057 | * | 2/1983 | Weise et al. ......................... 340/21 |
| 4,389,631 | | 6/1983 | Kajiyama et al. . |
| 4,392,214 | * | 7/1983 | Marini et al. ....................... 367/127 |
| 4,494,224 | | 1/1985 | Morrell et al. . |
| 4,606,015 | | 8/1986 | Yamaguchi . |
| 5,223,680 | * | 6/1993 | Schmidt-Milkau et al. ......... 187/134 |
| 5,306,882 | * | 4/1994 | Gerwing et al. .................... 187/134 |
| 5,406,200 | | 4/1995 | Begin et al. . |
| 5,509,505 | * | 4/1996 | Steger et al. ....................... 187/394 |
| 5,736,695 | * | 4/1998 | Hoepken .............................. 187/394 |
| 5,883,345 | * | 3/1999 | Schonauer et al. .................. 187/394 |

OTHER PUBLICATIONS

*Apparatus for Detecting Position,* Hoepken, 09/490,865, filed Jan. 24, 2000 (11 pg).

*Apparatus for Detecting Position,* Hoepken, 09/489,953, filed Jan. 24, 2000 (12 pg).

European Search Report, Apr. 26, 2000, Application No. EP 00 10 0975.

* cited by examiner

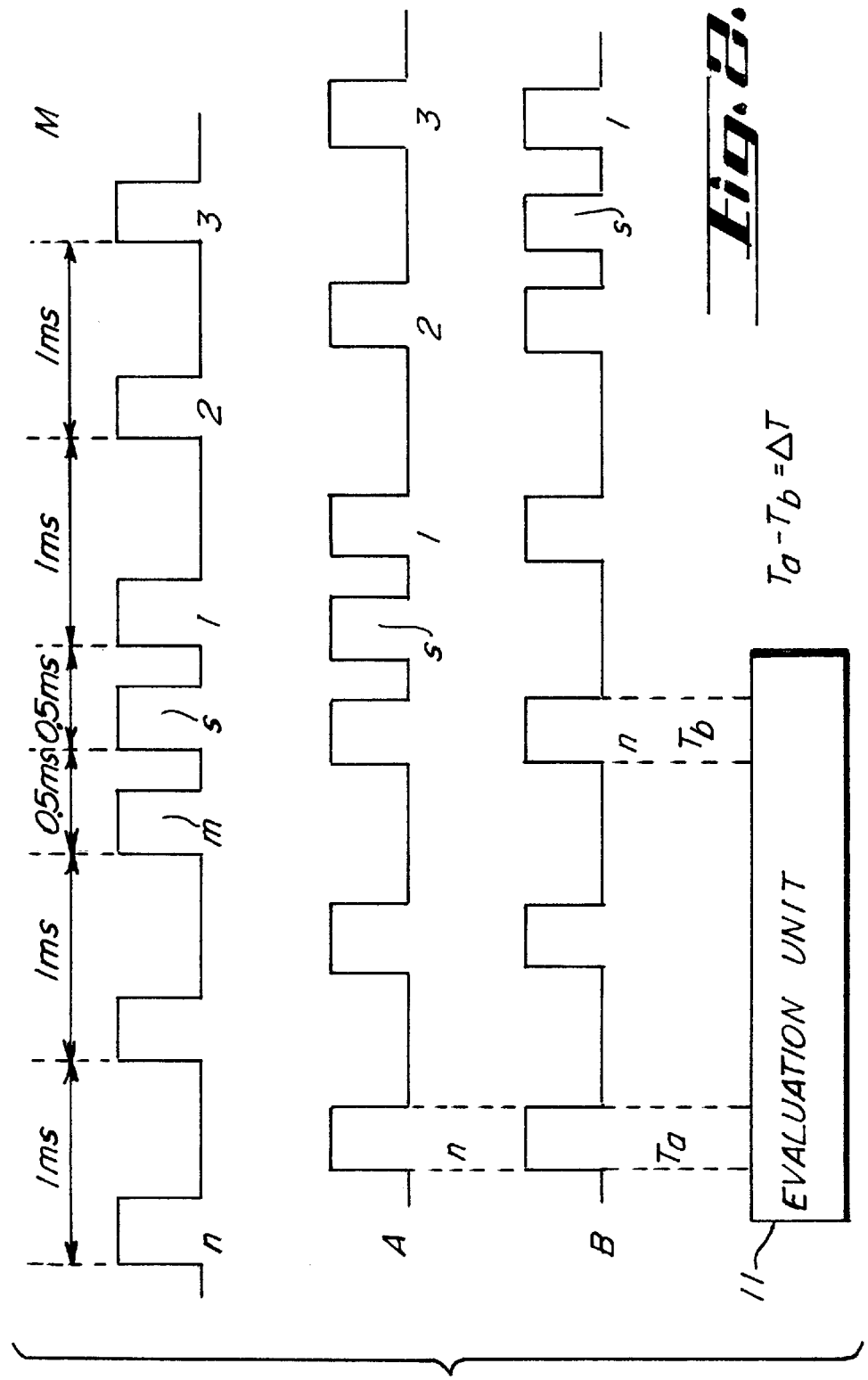

ACOUSTICAL POSITION DETECTOR

FIELD OF THE INVENTION

The invention relates to an apparatus for detecting the position of an object which can move along a predefined path. Such apparatus may be used for controlling the position of a lift cage or the like and thus ensuring its positioning at predetermined stops according to floor levels.

BACKGROUND OF THE INVENTION

European Patent 0 694 792 discloses an apparatus for detecting the position of a movable object, which has a sound signal conductor extending along a travel path and having a predetermined, uniform speed of sound propagation, as well as a signal injector, which is connected to a signal generator and is located on the movable object, for injecting a sound signal into the sound signal conductor. Arranged in this case at both ends of the sound signal conductor are signal extractors which are respectively connected to a counter, the two counters being clocked via a clock generator and connected to a subtractor for the output signals of the two counters. The output signal of the subtractor can be processed by an evaluation unit, as a measure of the delay time difference of the injected sound signal from the injecting point to the signal extractors, to form a signal which is representative of the instantaneous position of the movable object on the travel path, the signal injector operating with a signal spacing time which is greater than the sound delay time from one end of the travel path to the other.

The measured delay times from the sound injector to the signal extractors are assigned a positional value by means of the evaluation unit and a computational algorithm implemented in it. Specifically in the design of lifts, the evaluation unit is calibrated by assigning the flush point of each floor the result of the computational algorithm at this point and associating the lift position with this numerical value. Because of temperature-induced changes in buildings and/or changes in the length of the sound signal conductor, or owing to a change in the speed of sound in the sound signal conductor as a result of effects of temperature and diffusion, however, there is a shift in the assignment between the flush point and the numerical value assigned by the calibration.

SUMMARY OF THE INVENTION

It an the object of the invention to provide an apparatus for detecting the position of an object moveable along a prescribed distance, by a means of which it is possible to approach simply and accurately predetermined positions of the movable object on a travel path of great length.

An apparatus for detecting the position of an object moveable along a predetermined travel path according to the invention comprises an acoustic signal conductor extending along the travel path and having a predetermined, uniform speed of propagation of sound;

a signal input coupler located on the moveable object, to couple a clocked acoustic signal into the acoustic signal waveguide, a signal extractor being arranged at one end of the acoustic signal waveguide and being connected to an evaluation unit for determining the propagation-time of the sound signal from a position at which it is coupled in to signal extractor and for generating a signal representative of the instantaneous position of the moveable object on the travel path, wherein at least one sensor actuatable by being passed over by the movable object is arranged at a predetermined distance from the middle of the sound signal conductor and is coupled to the evaluation unit, which in accordance with an error polynomial whose coefficients are derived from errors, compensates errors of calibration points along the travel path, the respective error assigned to a specific distance of the travel path being yielded by evaluating the pulse emitted by the sensor assigned to the distance upon being passed over by the movable object.

Further objects, embodiments and advantages of the invention will become apparent from the following description and the claims.

BRIEF DESCRIPTION OF THE DRAWINGS

The invention will be explained in more detail below with reference to a preferred embodiment illustrated schematically in the appended drawings.

FIG. 2 shows a timing diagram relating to the signals of the device of FIG. 1.

DETAILED DESCRIPTION OF THE PREFERRED EMBODIMENT

Figure 1:
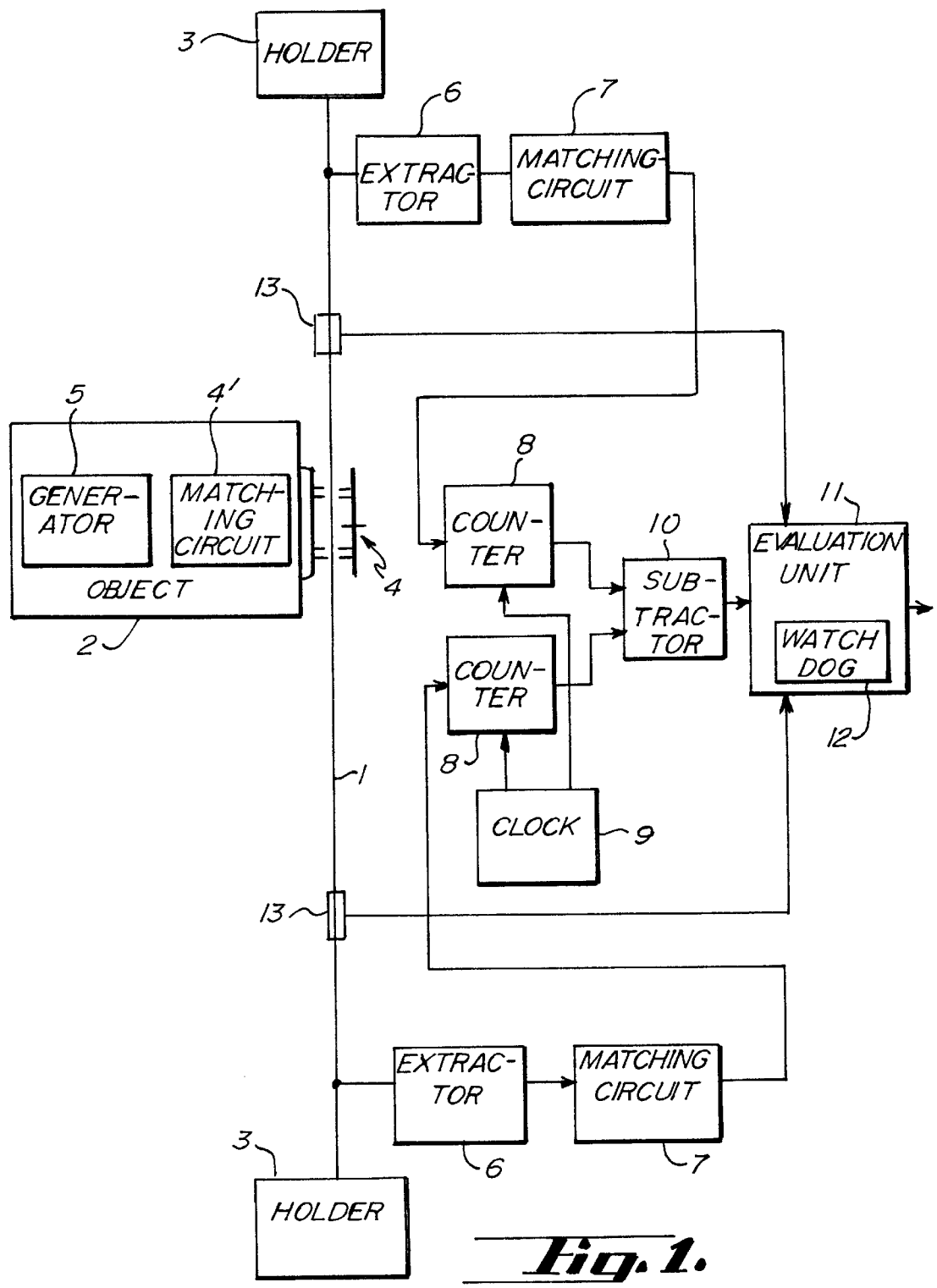
FIG. 1 shows a diagram of a device for detecting position according to the invention.

The represented device for detecting position, which can be used, in particular, to detect the position of a lift cage, comprises a sound signal conductor 1, for example a steel rail or, in particular, a wire which extends along a prescribed travel path, along which a movable object 2, for example a lift cage, can move to and fro. The sound signal conductor i with a predetermined, uniform speed of sound propagation is clamped or held in a damped fashion at both ends in a damping clamp or holder 3.

The movable object 2 bears a signal injector 4 (i.e. a signal input coupler) which is connected via a signal matching circuit 4' to a signal generator 5, for example an oscillator. The signal injector 4, which operates inductively, in particular, injects into the sound signal conductor 1 a sound signal which periodically comprises a synchronization pulses received by the signal generator 5. The synchronization pulses S have a cycle time which is greater than the delay time of the sound signal from one end of the sound signal conductor 1 to the other.

Moreover, the signal injector 4 injects additional pulses M, specifically a multiplicity of additional pulses M during each cycle time of the synchronization pulses S. The cycle time of the additional pulses M is such as to achieve a distance resolution in the direction of the travel path which is required by the object 2 in order to brake and to approach a precise position.

The synchronization pulses S are marked, that is to say can be distinguished from the additional pulses M in terms of evaluation. The marking can be performed, for example, by virtue of the fact that their cycle time is an appropriate multiple of the cycle time of the additional pulses M, and that they are additionally offset in time with reference to the additional pulses M, for example by half a clock time, compare the pulse train, generated by the signal generator 5, of the first line of FIG. 2. A predetermined number of additional pulses M then respectively follows a synchronization pulse S.

However, the marking can also be undertaken in a different way, thus the synchronization pulses S can differ from the additional pulses M by modulation, pulse width, pulse height or the like.

The synchronization and additional pulses S, M to be injected can be short electromagnetic pulses, for example single pulses or pulse trains, or a periodic frequency shift keying.

A signal extractor 6 (i.e. a signal output coupler) is arranged in each case at the ends of the sound signal conductor 1. This is preferably a piezoelectric signal extractor 6, but it is also possible to use ones which operate inductively or capacitively.

Each signal extractor 6 is connected to a signal matching circuit 7 whose output lines lead in each case to a counter 8. Both counters 8 are clocked by a clock generator 9, an oscillator. The cycle time of the clock generator 9 is substantially shorter than the delay time of the sound from one end of the sound signal conductor 1 to the other, and selected in accordance with the desired resolution of the measured distance. The outputs of the counters 8 are fed to a subtractor 10 which forms the difference between the output signals of the counters 8, and an evaluation unit 11, for example a microprocessor, where the output signal of the subtractor 10 is evaluated.

The synchronization pulses S serve the purpose of indicating to the evaluation unit 11 which subsequent pairs of additional pulses belong to one another, specifically the additional pulses M arriving after the respective synchronization pulses S, in each case nth, that is to say first, second, third, etc., at the two signal extractors 6 (denoted in FIG. 2 by A and B) at different times $T_a$ and $T_b$, so that the evaluation unit 11 can detect and/or determine the associated absolute time difference $T_a-T_b=\ddot{\text{A}}T$ between additional pulses M belonging together, and thus the position of the object 2.

The evaluation for the purpose of detecting position is performed primarily with reference to the additional signals M, but it is also possible to evaluate the synchronization pulses S in this regard, specifically chiefly, but not only, when the respective mth additional pulse is specially marked in order in this way to serve as synchronization pulse S.

If the movable object 2 is located in the middle between the signal extractors 6, the outputs of the counters 8 are identical and their difference is zero. If the object 2 (in the case of a vertical distance) is located above the middle, the output of the counter 8 connected to the upper signal extractor 6 is smaller than that of the other. The distance of the movable object 2 from the middle is yielded from the delay time difference, determined by the subtractor 10, of the additional pulses M belonging to one another in the sound signal conductor 1 and the known speed of sound in the latter. Since whenever the movable object 2 were to be located below the middle the difference would have a different sign, it is also known whether the movable object 2 is located above or below the middle, that is to say the precise position of the movable object 2 can be calculated. A digital or analogue positional signal which can be generated by the evaluation unit 11 in this way can be used for subsequent control.

A watchdog 12 (monitoring circuit) of the evaluation unit 11 can be used for simple monitoring of the measured distance in the case of a time-constant injection of the injected signal. In the case of contamination which is capable of damping the signal on the sound signal conductor 1, the difference determined by the subtractor 10 exceeds a predetermined value to which the watchdog 12 responds in order to trigger an appropriate warning signal or the like.

For the purpose of recalibrating, there are attached at at least two points along the sound signal conductor 1 sensors 13 which respond to being passed over by the movable object 2, for example switches which can be actuated by the passing object 2 and are, furthermore, linked with the evaluation unit 11 with the result that the latter is fed an appropriate pulse upon being passed over.

The sensors 13 are preferably arranged in pairs (at least one pair, which also depends, in particular, on the length of the sound signal conductor 1) at respectively the same distance from the middle of the sound signal conductor 1.

When calibrating the evaluation unit in accordance with the calibration points, for example the flush points of each floor, the two sensors 13 are also calibrated, that is to say a corresponding numerical value is assigned to the latter.

Errors such as occur owing to a change in the height of a building or to a change in the speed of sound in the sound signal conductor 1 because of the effects of temperature and/or diffusion, also act correspondingly on calibration points of the sensors 13 and are detected there, since the absolute position is always known from the pulses, and the difference between the existing calibration and the measurement at the instant of the occurence of the pulse therefore yields the error at that point on the travel path at which the respective sensor 13 is located. With the aid of the errors thus known at at least two points it is possible to determine at least one straight line in accordance with which the calibration points can be recalibrated by the evaluation unit 11.

In the case of a length of the sound signal conductor 1 which is not excessively great, two sensors 13 suffice, since the errors occurring have, to a first approximation, a linear dependence on the distance from a reference point. In the case of greater lengths, however, more than two sensors 13 are expedient, their error deviations being used to determine the coefficients of a polynomial of predetermined degree in accordance with which the recalibration of the calibration points, including those formed by the sensors 13, is undertaken.

The errors as a consequence of a change in the speed of sound in the sound signal conductor 1 on the real length of the measured distance are compensated by this continuously performed recalibration. This permits the use of a simple sound signal conductor 1 in the form of a wire.

The speed of sound in a sound signal conductor 1 made from steel is approximately 5300 m/s. For a temporal resolution of 188 ns, which requires a clock generator frequency of 5.3 MHz, the spatial resolution of the measured distance is 1 mm.

Although in the case of the above exemplary embodiment the starting point was two sensors 13 which are arranged at predetermined distances along the sound signal conductor 1, it is also possible to carry out the recalibration with the aid of only one sensor 13, since the error can be assumed to be zero in the middle of the sound signal conductor 1. In this case, the two points of the error straight line through the middle of the sound signal conductor 1 and the sensor 13 are determined. —If appropriate, it is also possible to arrange a sensor 13 in the middle of the sound signal conductor 1 in addition to and independently of the other number of sensors 13.

Instead of two signal extractors 6, it is also possible for only one signal extractor to be provided adjacent to one end of the sound signal conductor 1.

Instead of being coupled to the signal generator 5, the signal input coupler 4 may be triggered by evaluation unit 11 to couple the acoustic signals into the signal waveguide 1. Instead it is also possible that the signal input coupler 4 triggers the evaluation unit 11 via an electric signal to define the temporal start of each coupling of an acoustic signal into the signal waveguide 1 for the evaluation to be done by the evaluation unit 11.

While the invention has been shown and described with reference to a preferred embodiment, it should be apparent to one of ordinary skill in the art that many changes and modifications may be made without departing from the spirit and scope of the invention as defined in the claims.

What is claimed is:

1. An apparatus for detecting the position of an object moveable along a predetermined travel path, comprising:
    an acoustic signal conductor extending along the travel path and having a predetermined, uniform speed of propagation of sound;
    a signal input coupler located on the moveable object, to couple a clocked acoustic signal into the acoustic signal waveguide,
    a signal extractor being arranged at one end of the acoustic signal waveguide and being connected to an evaluation unit for determining the propagation-time of the sound signal from a position at which it is coupled in to signal extractor and for generating a signal representative of the instantaneous position of the moveable object on the travel path,
        wherein at least one sensor actuatable by being passed over by the movable object is arranged at a predetermined distance from the middle of the sound signal conductor and is coupled to the evaluation unit, which in accordance with an error polynomial whose coefficients are derived from errors, compensates errors of calibration points along the travel path, the respective error assigned to a specific distance of the travel path being yielded by evaluating the pulse emitted by the sensor assigned to the distance upon being passed over by the movable object.

2. The apparatus of claim 1, wherein the error polynomial is a straight line.

3. The apparatus of claim 1, wherein the error polynomial is a polynomial of higher degree.

4. The apparatus of claim 1, wherein at least two sensors are provided which are preferably arranged in pairs in a symmetrical fashion relative to the middle of the sound signal conductor.

5. The apparatus of claim 1, wherein the sound signal conductor is a wire.

6. The apparatus of claim 1, wherein the signal extractor is connected with a counter being clocked via a clock generator.

7. The apparatus of claim 6, wherein two signal extractors, one at each end of the acoustic wave conductor and each connected with a counter, are provided, wherein the counters are connected to a subtractor for the output signals of the two counters.

8. The apparatus of claim 6, wherein the clock generator for the counters operates at a minimum frequency required for an envisaged resolution of the measured distance.

9. The apparatus of claim 1, wherein the signal extractors are capacitive, inductive or, in particular, piezoelectric extractors.

10. The apparatus of claim 7, wherein the evaluation unit comprises a monitoring circuit which triggers a warning signal when the difference determined by the subtractor exceeds a predetermined value.

11. The apparatus of claim 1, wherein the movable object is a lift cage.

12. The apparatus of claim 1, wherein at each end of the sound signal conductor a signal extractor is provided which is coupled to the evaluation unit.

* * * * *